(12) United States Patent
Spath

(10) Patent No.: US 9,988,033 B2
(45) Date of Patent: Jun. 5, 2018

(54) PARKING BRAKE ACTUATOR WITH INTERNAL FLOW CONTROL

(71) Applicant: Bendix Spicer Foundation Brake LLC, Elyria, OH (US)

(72) Inventor: Timothy T. Spath, Lakewood, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 457 days.

(21) Appl. No.: 14/693,868

(22) Filed: Apr. 23, 2015

(65) Prior Publication Data

US 2016/0311421 A1 Oct. 27, 2016

(51) Int. Cl.
*B60T 17/22* (2006.01)
*B60T 17/08* (2006.01)

(52) U.S. Cl.
CPC .......... *B60T 17/083* (2013.01); *B60T 17/221* (2013.01)

(58) Field of Classification Search
CPC .... B60T 17/083; B60T 17/221; B60T 17/002; B60T 10/00; B60T 17/04; B60T 17/086
See application file for complete search history.

(56) References Cited

U.S. PATENT DOCUMENTS

| | | | |
|---|---|---|---|
| 4,960,036 A | 10/1990 | Gummer et al. | |
| 5,836,233 A | 11/1998 | Rumsey | |
| 6,148,711 A * | 11/2000 | Stojic ............ | B60T 17/083 137/509 |
| 8,714,318 B2 | 5/2014 | Darner et al. | |
| 2008/0000733 A1 | 1/2008 | Ehrlich | |
| 2014/0110999 A1 | 4/2014 | Eberling et al. | |

OTHER PUBLICATIONS

Bendix, Bendix Service Data SD-02-4525, Bendix(R)EverSure(R) Spring Brake with No Touch(TM) Technology, May 2015, pp. 1-8.

* cited by examiner

*Primary Examiner* — F. Daniel Lopez
*Assistant Examiner* — Abiy Teka
(74) *Attorney, Agent, or Firm* — Cheryl L. Greenly; Brian E. Kondas; Eugene E. Clair

(57) ABSTRACT

Various examples of brake actuators are provided. In one example, a brake actuator includes a parking brake chamber defined by a spring housing and an adapter base. The parking brake chamber includes a parking diaphragm that has an opening and the parking diaphragm is disposed between the spring housing and the adapter base which divides the brake spring chamber into a spring volume and a release volume, with the spring volume of the brake spring chamber being sealed from atmosphere. The parking brake chamber also includes a piston that is disposed in the spring volume and is in contact with the parking diaphragm, and the piston includes a piston passageway through the piston to allow air flow between the release volume and the spring volume.

24 Claims, 5 Drawing Sheets

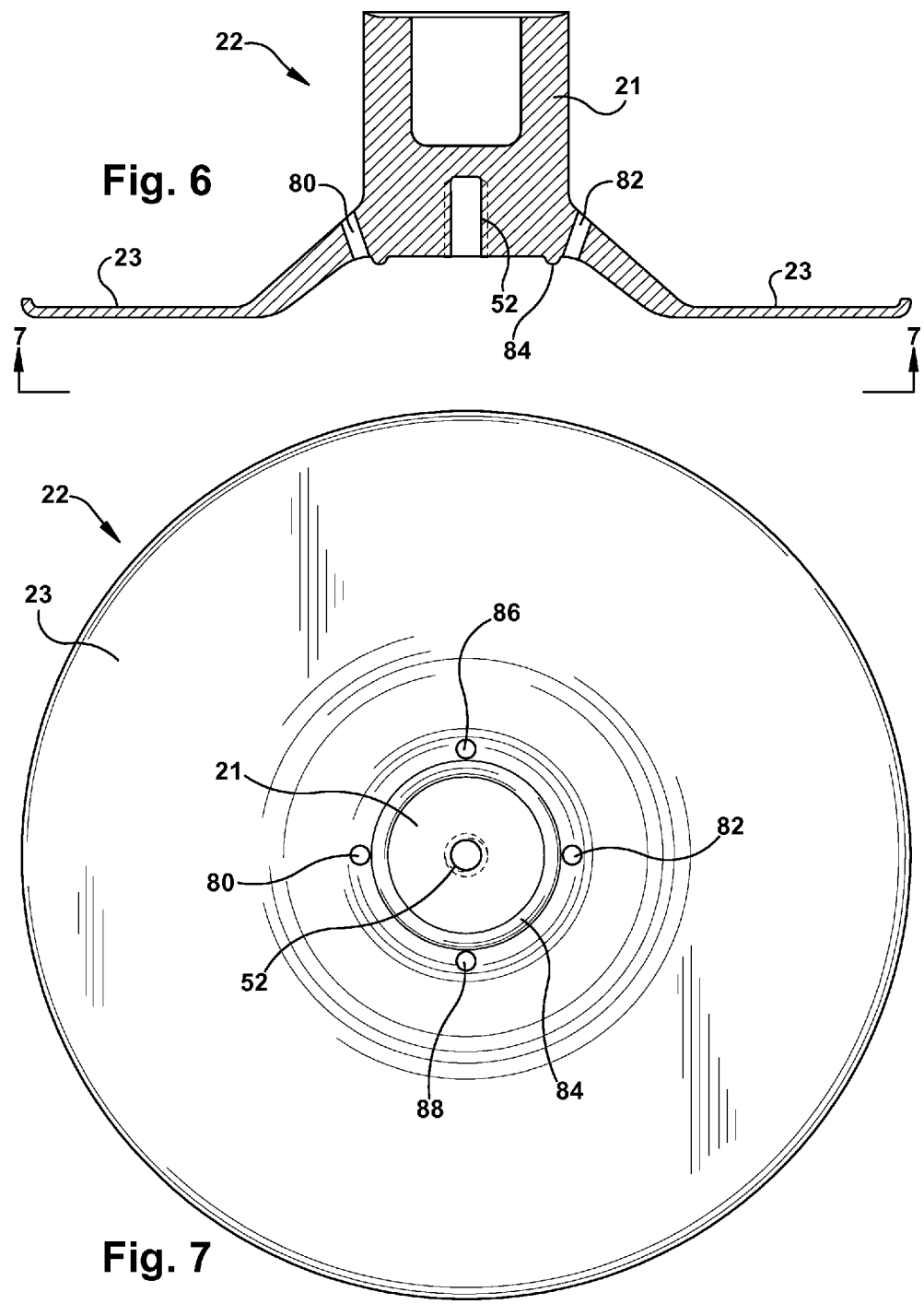

US 9,988,033 B2

PARKING BRAKE ACTUATOR WITH INTERNAL FLOW CONTROL

BACKGROUND

The present invention relates to a brake actuator in an air brake system. More specifically, the present invention relates to a parking brake actuator with a parking brake spring.

Parking brakes that operate with a spring to actuate the brake include a parking brake diaphragm that moves when air flows in and out of the parking brake chamber. Air enters the release volume of the parking brake spring chamber and the expansion compresses the brake spring during the parking brake "release" cycle. During the parking brake "apply" cycle air exits the release volume of the parking brake spring chamber and the spring volume of the parking brake spring chamber increases as the spring extends.

Many conventional brake actuators are open to the environment. These brake actuators have multiple internal components that are vulnerable to contamination in the applied position. Contamination of the spring volume causes corrosion of the power spring and other internal components, eventually causing brake chamber failure.

Other conventional brake actuators are configured to allow air out of but not into the spring volume of the brake spring chamber to minimize or eliminate the possibility of contamination of the components. However, during operation of actuators which are sealed in this manner, a vacuum can develop as the parking brake is applied and the spring volume within the brake spring chamber increases. The vacuum created during the brake apply cycle works against the brake actuator's delivery of full parking force for the particular spring type and spring stroke of the brake actuator. Thus, it would be beneficial to improve the brake actuator's delivery of full parking force while also preventing contamination inside the brake actuator.

SUMMARY

Various examples of a brake actuator are disclosed. In accordance with one aspect, a brake actuator includes a parking brake chamber defined by a spring housing and an adapter base. The parking brake chamber includes a parking diaphragm that has an opening and the parking diaphragm is disposed between the spring housing and the adapter base which divides the brake spring chamber into a spring volume and a release volume, with the spring volume of the brake spring chamber being sealed from the atmosphere. The parking brake chamber also includes a piston that is disposed in the spring volume and is in contact with the parking diaphragm, and the piston includes a piston passageway through the piston to allow air flow between the release volume and the spring volume.

In another aspect, the brake actuator includes a parking brake chamber defined by a spring housing and an adapter base. The brake actuator includes a parking diaphragm having an opening and is disposed between the spring housing and the adapter base and divides the brake spring chamber into a spring volume and a release volume, with the spring volume of the brake spring chamber being sealed from the inflow of environmental air. The parking brake chamber also includes a piston that contacts the parking diaphragm and is disposed in the spring volume portion of the parking brake chamber, the piston comprising an open passageway through the piston. The brake actuator also includes a means for moving the parking diaphragm away from the piston passageway to allow air flow from the release volume to the spring volume of the brake spring chamber.

In another aspect, a method for controlling fluid flow in a brake actuator, the method includes passing fluid from a release volume of a brake spring chamber through an opening of a parking diaphragm and through a passageway of a piston to a spring volume of the spring chamber, wherein the spring volume is sealed from the inflow of environmental air.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention. The components in the drawings are not necessarily to scale. Also, in the drawings, like reference numerals designate corresponding parts throughout the several views.

FIG. 6 is a close-up cross-sectional view of the pressure plate of a brake actuator, according to an example embodiment of the present invention; and FIG. 7 is a bottom view of the pressure plate taken across lines 7-7 of FIG. 6, according to an example embodiment of the present invention.

DETAILED DESCRIPTION

Example embodiments of the present invention are directed to a brake actuator, such as that used in a truck vehicle or other commercial vehicles. Although the examples explained herein relate to a brake actuator on trucks or other commercial vehicles with pneumatic brakes, it is understood that the brake actuator can be used in alternative applications. In addition, although the examples explained herein often describe fluid within the brake actuator as being air, it is understood that the various examples of a brake actuator can be used in alternative applications with alternative fluids.

Figure 1:
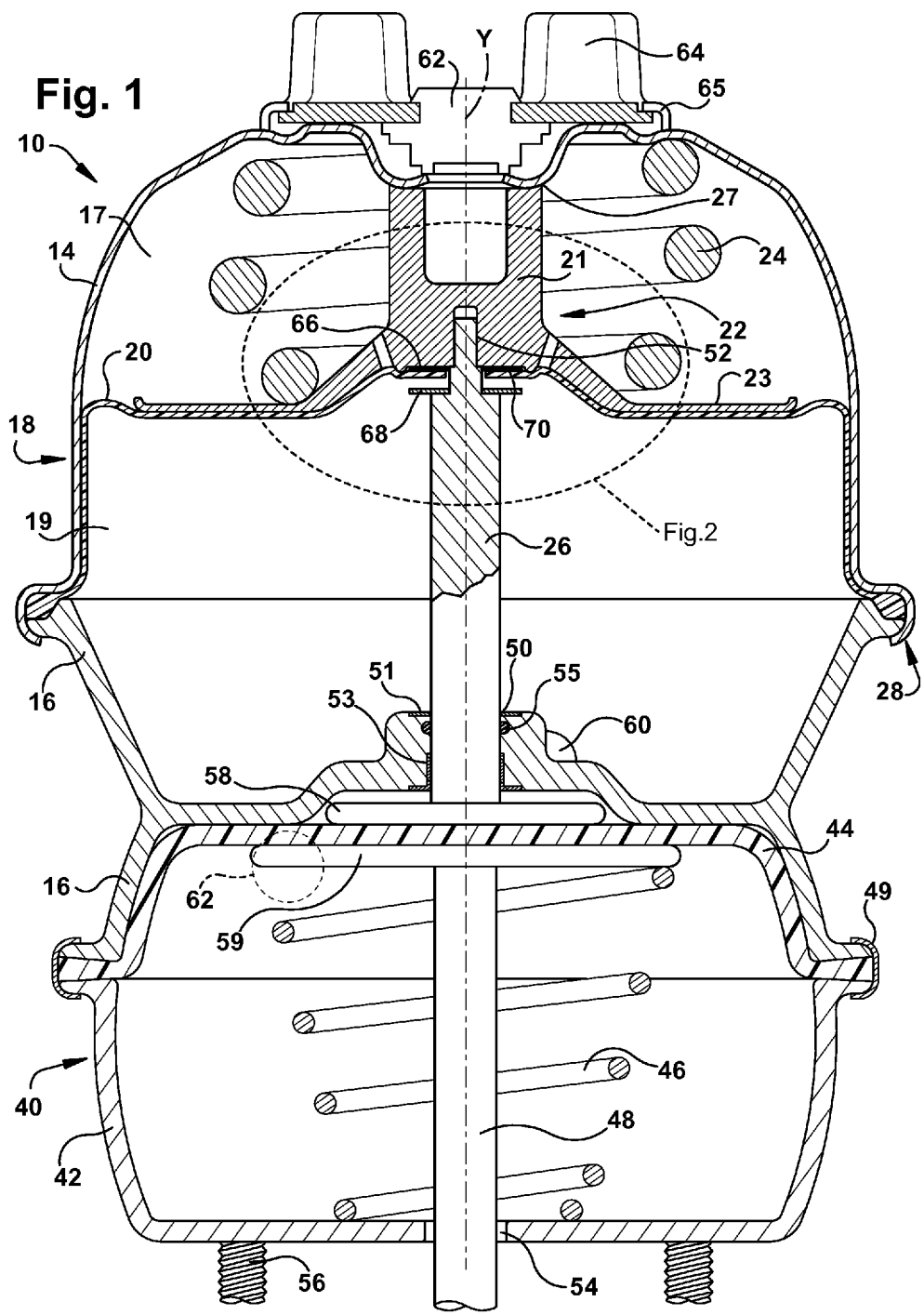
FIG. 1 is a schematic cross-sectional view of a parking brake actuator in a brake release state, according to an example embodiment of the present invention.

FIG. 1 illustrates a schematic, cross-sectional view of a parking brake actuator 10 in a parking brake "release" state, according to an example embodiment of the present invention. Brake actuator 10 is provided to control actuation and release of brakes, for example a drum brake or a disk brake, associated with one or more vehicle wheels. Brake actuator 10 includes a plurality of housing members that define and protect components inside brake actuator 10. For example, spring housing 14 and adapter base 16 define a parking brake chamber 18. Parking brake chamber 18 includes a parking brake diaphragm 20, a piston 22, a parking spring 24, a biasing member 70 and an adapter base push rod 26 which are movable between a brake "release" position (FIG. 1) and a brake "apply" position (FIG. 5), and from a brake apply to a brake release position in the brake apply and brake release cycles described below. Parking brake piston 22 includes piston head 21 and piston flange 23. A bead flange 28 of spring housing 16 is rolled over and crimped to secure the spring housing 16 to adapter base 18. The parking actuator optionally includes follower plate 66 which is disposed between biasing member 70 and parking diaphragm 20, and washer 68 which is disposed between parking diaphragm 20 and adapter base push rod 26.

Figure 5:
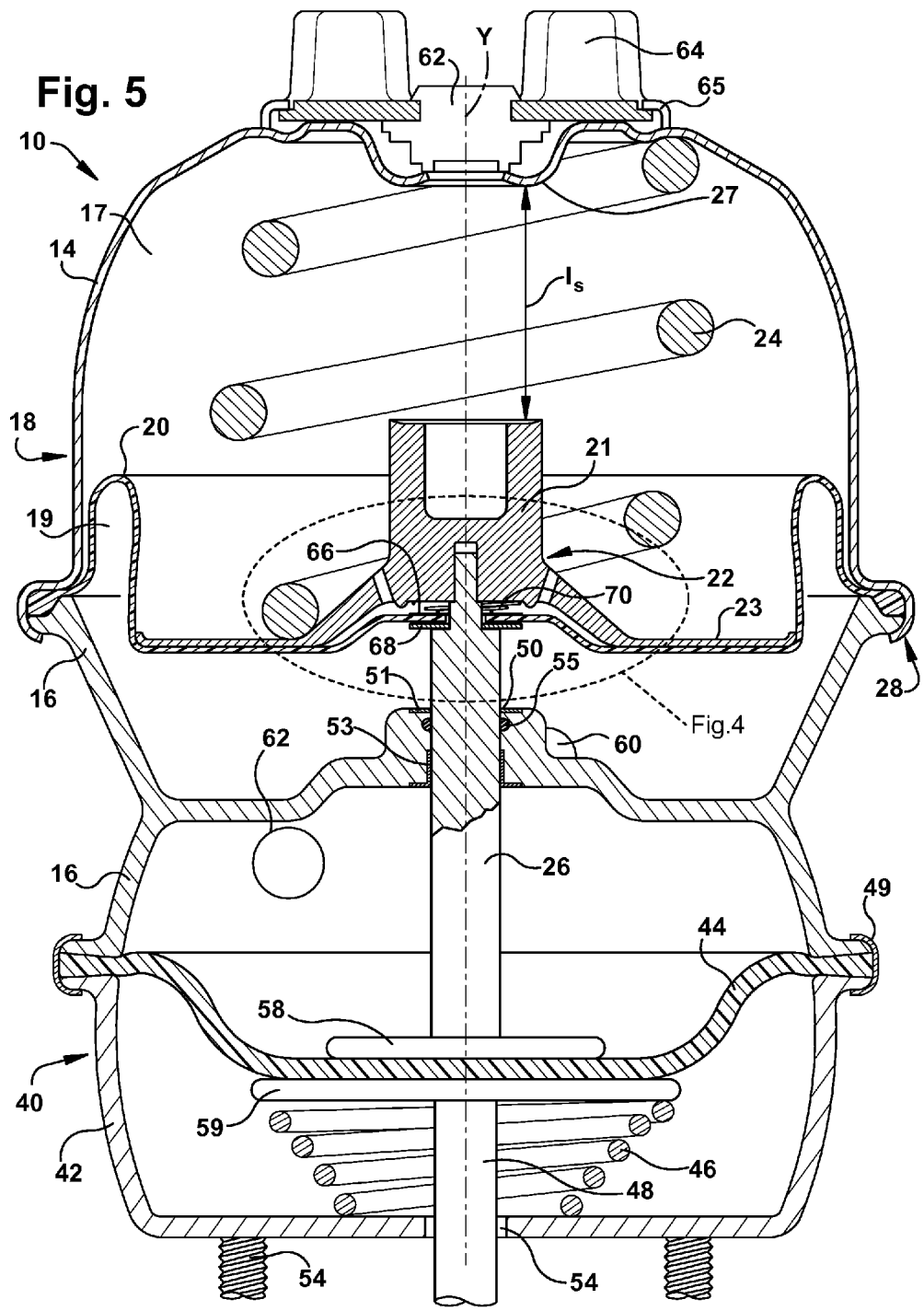
FIG. 5 is a schematic cross-sectional view of a parking brake actuator in a brake applied state, according to an example embodiment of the present invention.

Brake actuator 10 also includes a service brake chamber 40 defined by service housing 42 and adapter base 16. Service brake chamber 42 includes a service brake diaphragm 44, a service brake spring 46, and a push rod 48 which are movable between a service brake apply position (FIG. 1) and a service brake release position (FIG. 5). The service brakes are operated by the driver with the vehicle foot pedal and service brake control is independent of the parking brake control except that when the parking brake is applied, the service brake components are also used in application of the parking brakes. Service brake diaphragm 44 is held between service housing 40 and adapter base 16 and secured with clamping ring 49 or other fasteners can be used for field service. In another example a bead flange such as a bead flange 28 or other fasteners can be used for attaching housing 42 to adapter base 16.

Still referring to FIG. 1, adapter base 16 defines a central opening 50 and piston 22 defines a central cavity 52, both of which are centered about axis, Y, and through which the adapter base push rod 26 extends. The adapter base 16 optionally includes bushings 51 and 53 to support adapter base push rod 26 and an o-ring 55 to provide a tight seal for the parking brake chamber 18. Service housing 40 defines a central opening 54 centered about axis, Y, and through which the service push rod 48 extends. Brake actuator 10 is typically mounted on a vehicle axle with threaded mounting studs 56, for example, and brake unit (not shown) such that service push rod 48 is connected to an operating member of the brake and transfers forces generated in actuator 10 to the vehicle brakes in order to apply or release the parking brakes and release or apply the service brakes.

As mentioned above, parking diaphragm 20 is disposed within parking brake spring chamber 18 between spring housing 14 and adapter base 16. Parking diaphragm 20 divides the parking brake chamber 18 into a spring volume 17 and a release volume 19 on opposite sides of parking diaphragm 20. Fluid, for example air fluid, is introduced to the release volume through port 60 in a wall of adapter base 16. During the parking brake "release" cycle pressurized air, expands parking diaphragm 20 and the pressure urges piston 22 and adapter base push rod 26 which is connected to the piston 22 in one direction along axis, Y and away from the adapter base 16 to increase the release volume 19. This pressure on and by the diaphragm forces the parking brake spring 24 to compress to release the parking brake in the "brake release" position as shown in FIG. 1. In the brake release state piston 22 may contact spring housing 14. Brake actuator 10 also includes a vent 62, for example a one-way valve, for the flow of air out of the spring volume portion of parking brake chamber 18. The one-way valve or vent 62 eliminates the need to provide vent holes in the spring housing 14 and protects the spring volume from external contaminants. The one-way valve or vent 62 also seals the spring volume 17 portion of the parking brake chamber 18 to protect the internal components from foreign objects and elements.

Parking brake spring 24, for example a coil spring, has one end resting on spring housing 14, and an opposite end resting on parking brake piston 22. In this example, the piston head 21 has a geometry and height designed to control the stroke, or the extent of retraction, of the parking brake piston 22 in the parking brake "release" state which also controls the extent of compression of the parking brake spring 24. The piston abuts the spring housing 14 and transfers pressure load from the parking brake piston 22 to the spring housing when the parking brake piston and spring reach the fully-retracted position as shown in FIG. 1. Sufficient pneumatic pressure in the release volume 19 overcomes the spring force of the parking brake spring 24. Accordingly, brake actuator 10 is in the brake "release" state in FIG. 1 which is the normal mode of brake actuator 10 while the vehicle is driving in motion. The air pressure in the release volume 19 of the spring chamber is greater than the air pressure in the spring volume 17 and the parking diaphragm 20 is inflated and pressed against the piston 22 and biasing member 70.

Figure 2:
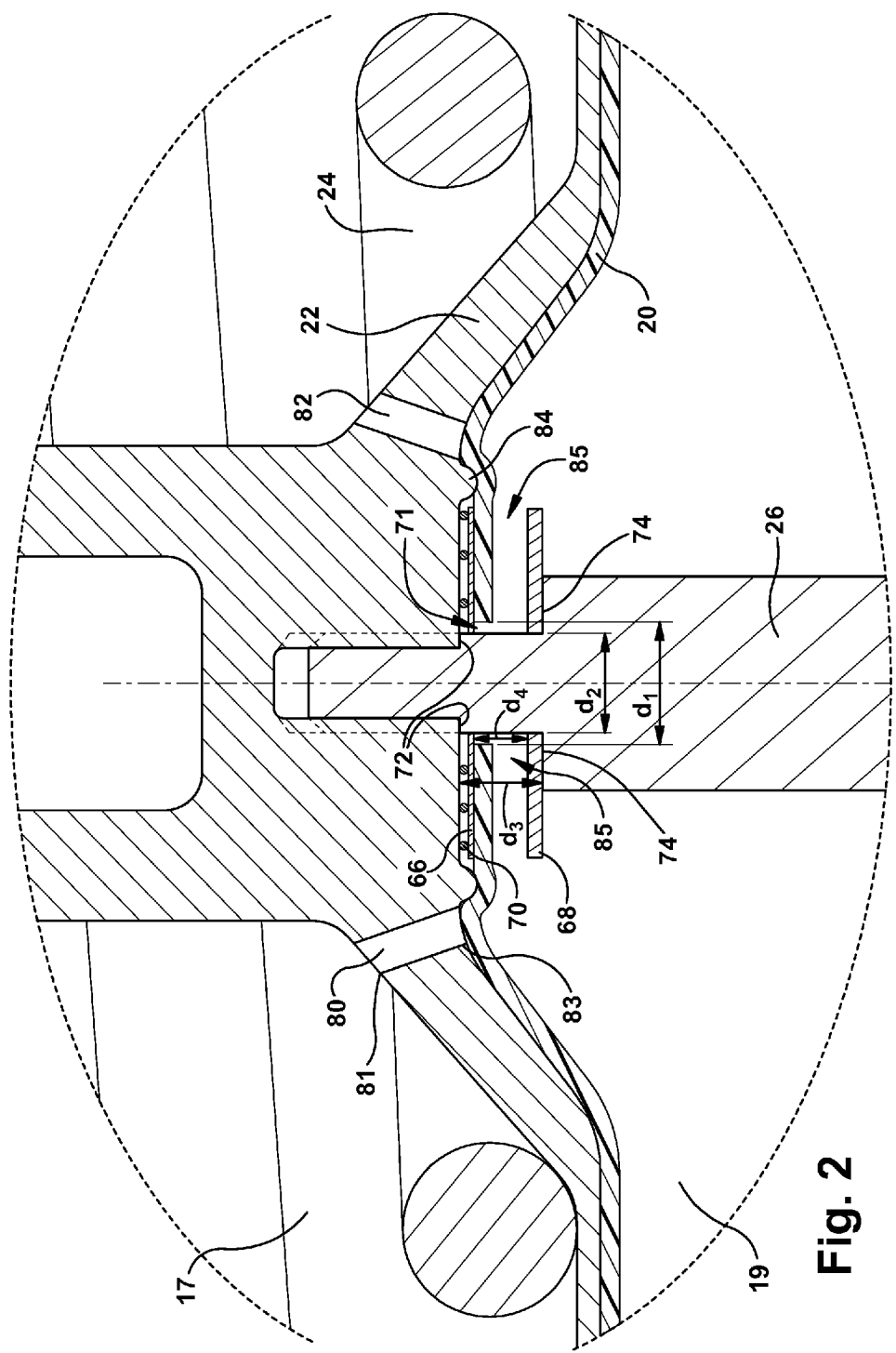
FIG. 2 is a close-up view of the dotted portion of parking brake actuator of FIG. 1 in the brake release state, according to an example embodiment of the present invention.

FIG. 2 is a close-up view of the dotted portion of parking brake actuator of FIG. 1 in the brake release state. The air pressure acting on the large parking diaphragm 20 during the brake release cycle presses the parking diaphragm 20 against parking piston 22 and against the piston passageways 80, 82 to create a leak-free seal that prevents air flow from the release volume 19 to the spring volume 17 of the parking spring chamber 18. Parking diaphragm 20 is made of a pliable material, for example, a flexible thermoplastic or flexible thermoset, including reinforced thermoplastics or thermosets and blends thereof. Suitable materials for parking brake diaphragm 20 include, but are not limited to, natural rubber, neoprene, and mixtures thereof, for example. Piston passage 80, for example, extends from a spring-side surface 81 of piston to a diaphragm-side surface 83 of piston and defines a channel for fluid flow between the release volume and spring volume. The pressure in the release volume of the parking brake chamber is typically greater than in the spring volume during all cycles. The spring volume pressure is typically limited to no more than slightly above atmospheric pressure as governed by the setting of one-way vent 62 (FIG. 1).

In accordance with another aspect of the present invention, the parking diaphragm 20 is movable to control fluid or air flow between the release volume 19 and the spring volume 17 of the parking brake chamber based on differential pressure in those volumes. Parking diaphragm 20 has an opening 71 in alignment with axis Y through which adaptor base push rod 26 extends, and through which air can flow from release volume 19 to spring volume 17. Opening 71 has a diameter, $d_1$ which surrounds adapter base push rod 26 having a smaller diameter $d_2$. The difference between diameter $d_1$ and $d_2$ creates annular opening 71 through which air from release volume 19 can flow to spring volume 17 during parking brake "apply" cycle as will be further described. In the brake release state as shown, the force on the parking diaphragm 20 against piston 22 created by the air pressure in the release volume 19 overcomes the force of the biasing member 70, for example a valve spring, on parking diaphragm 20. Force exerted by air pressure onto parking diaphragm 20 is transferred to biasing member 70 which is shown compressed against piston 22. The tight seal of parking diaphragm against piston 22 and piston passageways 80, 82 prevents the flow of air from release volume 19 to spring volume 17 of parking brake chamber 18.

Biasing member 70 urges parking diaphragm 20 away from passageways 80, 82 when the pressure differential $P_D$ across the diaphragm, is less than a predetermined threshold pressure, $P_T$. The predetermined threshold pressure is a design parameter that is based on, but is not limited to, at least one of: the stiffness and or height of biasing member 70, the diameter of the diaphragm, the stiffness of the diaphragm, for example, etc. The pressure differential, $P_D$, in question is defined as the difference between the pressure in the release volume, $P_R$, and the pressure in the spring volume, $P_S$, as described below:

$$P_D = P_R - P_S;$$

wherein the predetermined threshold pressure $P_T$, is determined based on the particular brake actuator 10 being considered. Accordingly, as pressure drops in release volume 17, a predetermined threshold pressure PT, is eventually reached and biasing member 70 forces parking diaphragm away from passageways 80, 82.

It is to be understood that the biasing member 70 is not limited to a spring or even a coil spring, but includes any elastic member which provides the energy storage and return function required to urge the diaphragm when the pressure differential, $P_D$, is less than predetermined threshold pressure, $P_T$. For example, alternative spring configurations, including multiple coil springs, leaf springs, cantilevered springs, etc., and alternative elements such as resilient blocks or chargeable high pressure bladders, are within the scope of the present invention. The biasing member can be constructed from a variety of materials, for example, metal, polymers, and wires and/or natural and synthetic fibers made of metal or polymer or both.

FIG. 2 also illustrates the detail of adapter base push rod 26 which contacts piston 22 at shoulder 72. A second shoulder 74 is spaced a distance $d_3$ away from shoulder 72 of piston 22. In such case, distance $d_3$ is greater than the combined thickness of diaphragm 20 and the biasing member 70, in a compressed state as shown. This creates a clearance or gap 85 for movement of parking diaphragm 20 away from piston 22. Therefore, in one example embodiment, biasing member 70 and parking diaphragm 20 are pressed tightly against piston 22 and a gap 85 is formed between the parking diaphragm 20 and the adapter plate push rod 26. In another example embodiment, follower plate 66 or washer 68, or both, are present. Follower plate 66 is an optional component which protects the parking diaphragm from wear by contact from biasing member 70. Washer 68 is can be used to limit travel of diaphragm 20. In an example where both follower plate 66 and washer 68 are utilized as shown, follower plate 66 is spaced a distance $d_4$ away from washer 68 and the distance between them, $d_4$, is greater than the thickness of parking diaphragm 20. A clearance or gap 85 remains between parking diaphragm 20 and washer 68 as shown, and gap 85 varies in size. Gap 85 allows room for biasing member 70 to expand so that at least a portion of parking diaphragm 20 can be urged away from the piston 22 by biasing member 70 when the differential pressure, $P_D$, is below the predetermined threshold pressure, $P_T$, as illustrated in FIGS. 3, 4 and 5.

As mentioned above, parking brake actuator 10 is in the parking brake release state when the vehicle is being driven and is in motion. When the vehicle operator engages the parking brake control to apply the parking brake, a valve in pneumatic communication with port 60 is opened and air in the release volume flows out of the port while the brake spring pushes the piston and diaphragm toward the release volume and away from the plug and one-way valve. Since the air pressure inside the release volume exceeds the pressure inside the brake spring volume, the diaphragm is pushed against the piston until the spring force of biasing member, for example, valve spring 70 exceeds the force on the parking diaphragm 20 imparted by the air pressure differential between the release volume and the spring volume.

Figure 3:
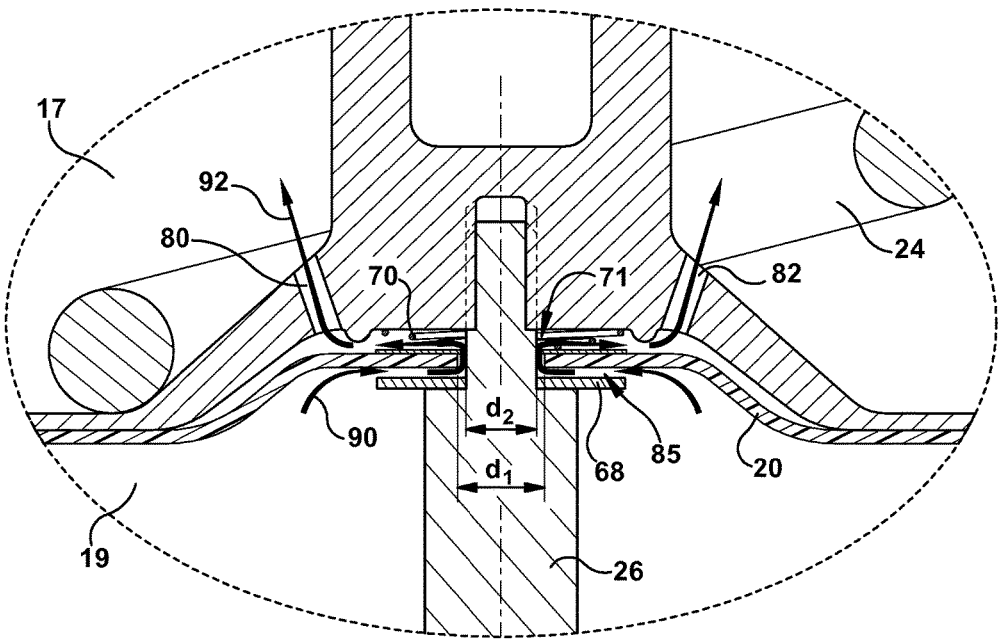
FIG. 3 is a close-up view of the dotted portion of parking brake actuator of FIG. 1 in a transient state during parking brake application, according to an example embodiment of the present invention.
Figure 4:
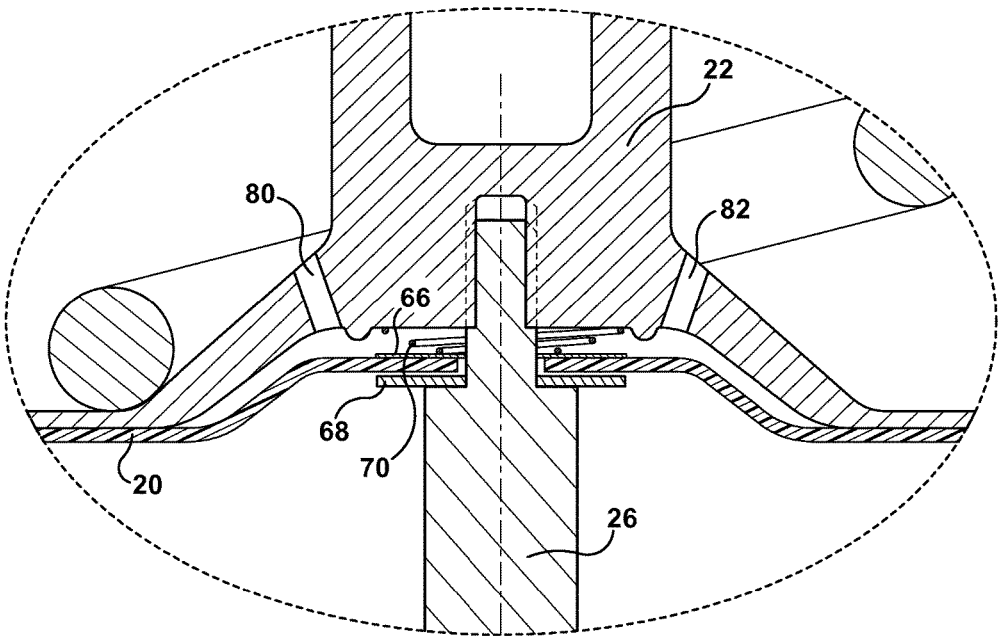
FIG. 4 is a close-up view of the dotted portion of parking brake actuator in the brake applied state, according to an example embodiment of the present invention.

FIG. 3 is a close-up view of the dotted portion of parking brake actuator of FIG. 1 during parking brake application. Biasing member 70, for example, a valve spring, is disposed between the piston and the diaphragm and is in transition from a compressed mode to a fully expanded mode. Even when partially expanded, biasing member 70 urges parking diaphragm 20 away from piston 22 when the pressure differential, $P_D$, across the diaphragm, reaches the predetermined threshold pressure, $P_T$. That is, during the brake apply cycle, biasing member 70 provides a biasing force on parking diaphragm 20 urging it to a floating position between the piston and washer that permits clean dry air in the parking brake release volume 19 to pass, as indicated by arrow 90, through opening 71 of parking diaphragm 20 and through passageway 80, as indicated by arrow 92, into the spring volume 17 when the pressure differential, $P_D$, across the parking diaphragm 20 has fallen below the predetermined threshold pressure, $P_T$. Air enters passage 80 on the diaphragm-side surface 83 of piston 22 and exits adjacent spring-side surface 81 of piston 22.

The predetermined threshold pressure, $P_T$, is a pressure at which air can begin to pass over to spring volume 17 and is preferably low enough to prevent excessive amount of air to flow from release volume 19 into spring volume 17 during the brake apply or brake release cycle. The predetermined threshold pressure is also determined to permit air passage to spring volume 17 to alleviate the vacuum created in spring volume 17 by the application of parking brakes. The predetermined threshold pressure, $P_T$, can depend on a variety of factors such as the vacuum created during spring volume expansion and other factors known to those of skill in the art. In another example, the predetermined threshold pressure, $P_T$, can be slightly greater than the absolute value of the vacuum created in spring volume 17. For example, if a vacuum of -8 psi is created in spring volume 17 of a particular brake actuator at full stroke, the predetermined threshold pressure, $P_T$, should be slightly greater than 8 psi to alleviate the vacuum. In this example, biasing member 70 would urge parking diaphragm away from passage 80 when pressure in release volume 19 relative to spring volume 17 dropped from a high pressure, for example, 100-130 psi, to a threshold pressure that approaches, and is greater than 8 psi. Accordingly, in one example the predetermined threshold pressure at which the parking diaphragm 20 moves away from piston 22, is less than about 120% of the absolute value of the vacuum pressure in spring volume 17, and in another example, less than about 110% of the absolute value of vacuum pressure created in spring volume 17 for a given brake actuator design. In another example, the predetermined threshold pressure, $P_T$, can range from about 5 psi to about 15 psi.

Biasing member 70 is designed to overcome the positive predetermined threshold pressure and move parking diaphragm away from the passageway 80 to permit air flow into spring volume 17. For example, a biasing member 70 that is a valve spring as shown, will have a spring constant that is great enough such that in the compressed position it generates sufficient force to overcome the positive pressure in release volume 19. The spring force of the valve spring is designed based on the pressure differential, $P_D$, across parking diaphragm 20, decreasing below the predetermined threshold pressure, $P_T$, and should not be too strong or else, for example, a substantial volume of air from the release chamber will flow into the spring chamber and leak out of the system through the vent or one-way valve 62 during brake release.

FIGS. 4 and 5 illustrate parking brake actuator 10 in the parking brake applied state. Biasing member 70 can be in a partially extended or fully extended position and is shown pressed indirectly against parking diaphragm 20 and indirectly against follower plate 66 which can be optionally employed to protect the surface of parking diaphragm. Parking diaphragm 20 is shown pressed against optional washer 68 and indirectly against shoulder 74 of the adapter base push rod 26. FIG. 5 is a schematic cross-sectional, full view of a parking brake actuator in a brake applied state. As shown, parking brake spring 24 is in the extended position, the default brake "apply" position. Spring volume 17 is larger than in the parking brake "release" state (FIG. 1). Parking diaphragm 20 is deflated with release volume 19 having little remaining pressure. Piston 22 is dropped a stroke distance, $l_s$, from spring housing 14. The example brake actuators described herein prevents or eliminates vacuum in spring volume 17 which allows a greater portion of force stored by parking brake spring 24 to be delivered to the foundation brake.

FIG. 6 is a cross-sectional view of piston 22 illustrating several features. Piston 22 has an annular protrusion or annular ring 84 disposed between central cavity 52 and piston passageways 80, 82, 86 and 88 and at a radial distance from central cavity 52 which is less than the radial distance of the piston passageways from central cavity 52. Protrusion 84 locates and retains the biasing member, preventing slippage from position. Annular protrusion 84 preferably has a smooth surface to facilitate an improved seal of parking diaphragm 20 against diaphragm-side surface 83 of piston 22. The height of annular protrusion 84 is at least as great as the height of the biasing member 70, for example the height of compressed biasing member 70, for example, valve spring, in the parking brake release state as shown (FIG. 2) to facilitate improved sealing of parking diaphragm 20 against piston passageways.

FIG. 7 is a diaphragm-side view of the parking piston 22 taken across lines 7-7 of FIG. 6. The piston flange 23 can have an area that is significantly greater than the piston head 21. Piston 22 has a plurality of passageways, 80, 82, 86 and 88, to increase or evenly distribute the flow of air between the release volume 19 and spring volume 17. Annular protrusion 84 is radially disposed between central opening 52 and passageways 80, 82, 86 and 88.

The embodiments described herein provide for a brake actuator with internal flow control of clean air within the parking brake chamber. A biasing member is capable of forcing the parking diaphragm away from the parking piston when there is low air pressure in the parking release chamber, allowing clean system air which resides in the release volume to flow to the spring volume of the parking brake chamber. This prevents or eliminates any buildup of a vacuum in the spring volume which allows a larger portion of the parking spring's full force to be delivered to the foundation brake. The sealed spring chamber design guards against external contaminants, such as salt and gravel.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A brake actuator, comprising:
   a parking brake chamber defined by a spring housing and an adapter base;
   a parking diaphragm comprising an opening disposed between the spring housing and the adapter base, wherein the diaphragm divides the brake chamber in to a spring volume and a release volume and the spring volume is sealed from atmosphere; and
   a piston adjacent to a parking diaphragm and disposed in the spring volume portion of the parking brake chamber, the piston comprising a piston passageway through the piston to allow air flow through the piston;
   an adaptor push rod having a first shoulder and a second shoulder, the first shoulder located a distance from the second shoulder, the first shoulder being in contact with the piston; and
   wherein the parking diaphragm is movable between the first shoulder and the second shoulder; wherein the parking diaphragm contacts the first shoulder to prevent air flow and is movable away from the first shoulder towards the second shoulder to allow air flow.

2. The brake actuator of claim 1, wherein at least a portion of the parking diaphragm is movable away from the piston to permit air flow between the release volume and the spring volume.

3. The brake actuator of claim 1, comprising a biasing member disposed between the first shoulder and the second shoulder of the adaptor push rod; and
   wherein the distance between the first shoulder and the second shoulder includes the clearance and the combined thickness of diaphragm and the biasing member in a compressed state.

4. The brake actuator of claim 1, comprising a biasing member disposed between the piston and the parking diaphragm, wherein the biasing member urges the diaphragm away from the piston when the differential pressure across the parking diaphragm is less than a predetermined threshold pressure.

5. The brake actuator of claim 4, wherein the biasing member is a spring.

6. A brake actuator comprising:
   a parking brake chamber defined by a spring housing and an adapter base;
   a parking diaphragm comprising an opening disposed between the spring housing and the adapter base, wherein the diaphragm divides the brake chamber in to a spring volume and a release volume and the spring volume is sealed from atmosphere; and
   a piston adjacent to a parking diaphragm and disposed in the spring volume portion of the parking brake chamber, the piston comprising a piston passageway through the piston to allow air flow between the release volume to the spring volume;
   an adapter base push rod connected to the piston;
   a biasing member, wherein the adapter base push rod comprises a first shoulder that contacts the piston and a second shoulder spaced a distance from the piston, and the biasing member and parking diaphragm are disposed between the first shoulder and the second shoulder; and a clearance between the parking diaphragm and the second shoulder.

7. The brake actuator of claim 6, wherein the biasing member is disposed between the piston and the parking diaphragm, and wherein the biasing member is compressed and the piston passageway is covered by the parking diaphragm.

8. The brake actuator of claim 6, wherein the piston comprises an annular ring which protrudes from the piston toward the parking diaphragm.

9. The brake actuator of claim 6, comprising a biasing member disposed between the annular ring and a central cavity of the piston.

10. The brake actuator of claim 9, wherein the height of the annular ring is at least as great as the height of the biasing member in a compressed state.

11. The brake actuator of claim 6, comprising a follower plate disposed between the biasing member and the parking diaphragm.

12. The brake actuator of claim 6, comprising a washer disposed between the diaphragm and the second shoulder.

13. The brake actuator of claim 6, wherein the distance between the first shoulder and the second shoulder of the adaptor push rod is greater than the combined thickness of the diaphragm and the biasing member in a compressed state.

14. The brake actuator of claim 6, wherein the biasing member is selected from the group consisting of: a spring, a bladder, a resilient block, and combinations thereof.

15. The brake actuator of claim 14, wherein the predetermined threshold pressure ranges from about 5 psi to about 15 psi.

16. The brake actuator of claim 14, wherein the biasing member urges the diaphragm away from the piston when the differential pressure across the parking diaphragm is less than a predetermined threshold pressure and the predetermined threshold pressure is less than about 120% of the absolute value of the maximum possible vacuum pressure in the spring volume.

17. The brake actuator of claim 6, wherein the biasing member is an elastic member which provides storage energy and a return function.

18. A brake actuator comprising:
a parking brake chamber defined by a spring housing and an adapter base;
a parking diaphragm comprising an opening disposed between the spring housing and the adapter base, wherein the diaphragm divides the brake chamber in to a spring volume and a release volume and the spring volume is sealed from environmental air;
a piston that contacts the parking diaphragm and is disposed in the spring volume portion of the parking brake chamber, the piston comprising a piston passageway through the piston, the passageway having a first opening on a spring-side piston surface and a second opening on a diaphragm-side piston surface;
an adaptor base push rod having a first shoulder and a second shoulder, the first shoulder located a distance from the second shoulder, the first shoulder being in contact with the piston;
a clearance between the parking diaphragm and the second shoulder; and
a means for moving the parking diaphragm between the first shoulder and the second shoulder to allow air flow between the release volume to the spring volume of the brake spring chamber.

19. A method for controlling fluid flow in a brake actuator, the method comprising:
passing fluid from a release volume of a brake spring chamber through an opening of a parking diaphragm and through a passageway of a piston to a spring volume of the spring chamber which is sealed from the atmosphere; and
urging the parking diaphragm away from the piston passageway when the pressure differential across the parking diaphragm is less than a predetermined threshold pressure.

20. The method of claim 19, wherein the predetermined threshold pressure ranges from about 5 psi to about 15 psi.

21. The method of claim 19, wherein the parking diaphragm is urged away from the piston passageway by a biasing member that expands when the pressure differential across the parking diaphragm is less than a predetermined threshold pressure.

22. The method of claim 21, wherein the biasing member is compressed and the parking diaphragm covers the piston passageway when the pressure differential across the parking diaphragm is at least as great as the predetermined threshold pressure.

23. The method of claim 21, wherein the biasing member is selected from the group consisting of: a spring a bladder, a resilient block, and combinations thereof.

24. The method of claim 23, wherein the biasing member is a spring and the spring expands when the predetermined threshold pressure ranges from about 5 psi to about 15 psi.

* * * * *